United States Patent [19]

Hughes et al.

[11] Patent Number: 4,869,814
[45] Date of Patent: Sep. 26, 1989

[54] APPARATUS FOR SEPARATING DISPERSED PHASES FOR FLUID MIXTURES

[75] Inventors: Victor B. Hughes, Chester; Ian Veltman, London, both of England

[73] Assignee: Shell Oil Company, Houston, Tex.

[21] Appl. No.: 238,388

[22] Filed: Aug. 31, 1988

[30] Foreign Application Priority Data

Sep. 2, 1987 [GB] United Kingdom ................ 8720615

[51] Int. Cl.$^4$ .................... C02F 9/00; B01D 35/10; B01D 17/025
[52] U.S. Cl. .................................... 210/142; 210/194; 210/195.1; 210/260; 210/512.1; 210/519; 210/521
[58] Field of Search ................ 210/134, 194, 195.1, 210/260, 512.1, 512.3, 513, 519, 521, 533, 539, 693, 799, 800, DIG 5, 138, 142, 143; 55/419, 521; 137/172

[56] References Cited

U.S. PATENT DOCUMENTS

| | | | |
|---|---|---|---|
| 4,046,698 | 9/1977 | Pielkenrood | 210/513 |
| 4,133,771 | 1/1979 | Pielkenrood | 210/521 |
| 4,203,843 | 5/1980 | Carlstedt | 210/DIG. 5 |
| 4,351,488 | 11/1982 | White et al. | 210/799 |
| 4,442,000 | 4/1984 | Pielkenrood | 210/DIG 5 |
| 4,619,771 | 10/1986 | Stall et al. | 210/512.1 |
| 4,640,781 | 2/1987 | Hughes | 210/520 |
| 4,647,371 | 3/1987 | Shcmitt et al. | 137/172 |
| 4,650,503 | 3/1987 | Juzi | 55/419 |
| 4,650,581 | 3/1987 | Angles et al. | 210/DIG. 5 |
| 4,698,152 | 10/1987 | Carroll | 210/195.1 |

FOREIGN PATENT DOCUMENTS

| | | | |
|---|---|---|---|
| 0004724 | 10/1979 | United Kingdom | 210/DIG. 5 |
| 2135207 | 8/1984 | United Kingdom | 210/693 |
| 2156233 | 10/1985 | United Kingdom | 210/DIG. 5 |
| 2161395 | 1/1986 | United Kingdom | 210/DIG. 5 |

*Primary Examiner*—Richard V. Fisher
*Assistant Examiner*—Joseph Drodge
*Attorney, Agent, or Firm*—Ronald R. Reper

[57] ABSTRACT

An apparatus for separating dispersed phases from fluid mixtures comprising a fluid separation chamber provided with a plurality of fluid outlet ports for discharge of fluids with different densities, and fluid inlet means for introducing the mixture into the chamber comprising at least one tubular neck portion in which a cluster of fibers is compressed to a fibrous bed. Each tubular neck portion is arranged to a level between the top portion and a bottom portion of the chamber and at an angle relative to the vertical thereby reducing the chance of accumulation of foamy or solid contaminants in the fibrous bed and allowing continuous removal thereof from the separation chamber.

9 Claims, 1 Drawing Sheet

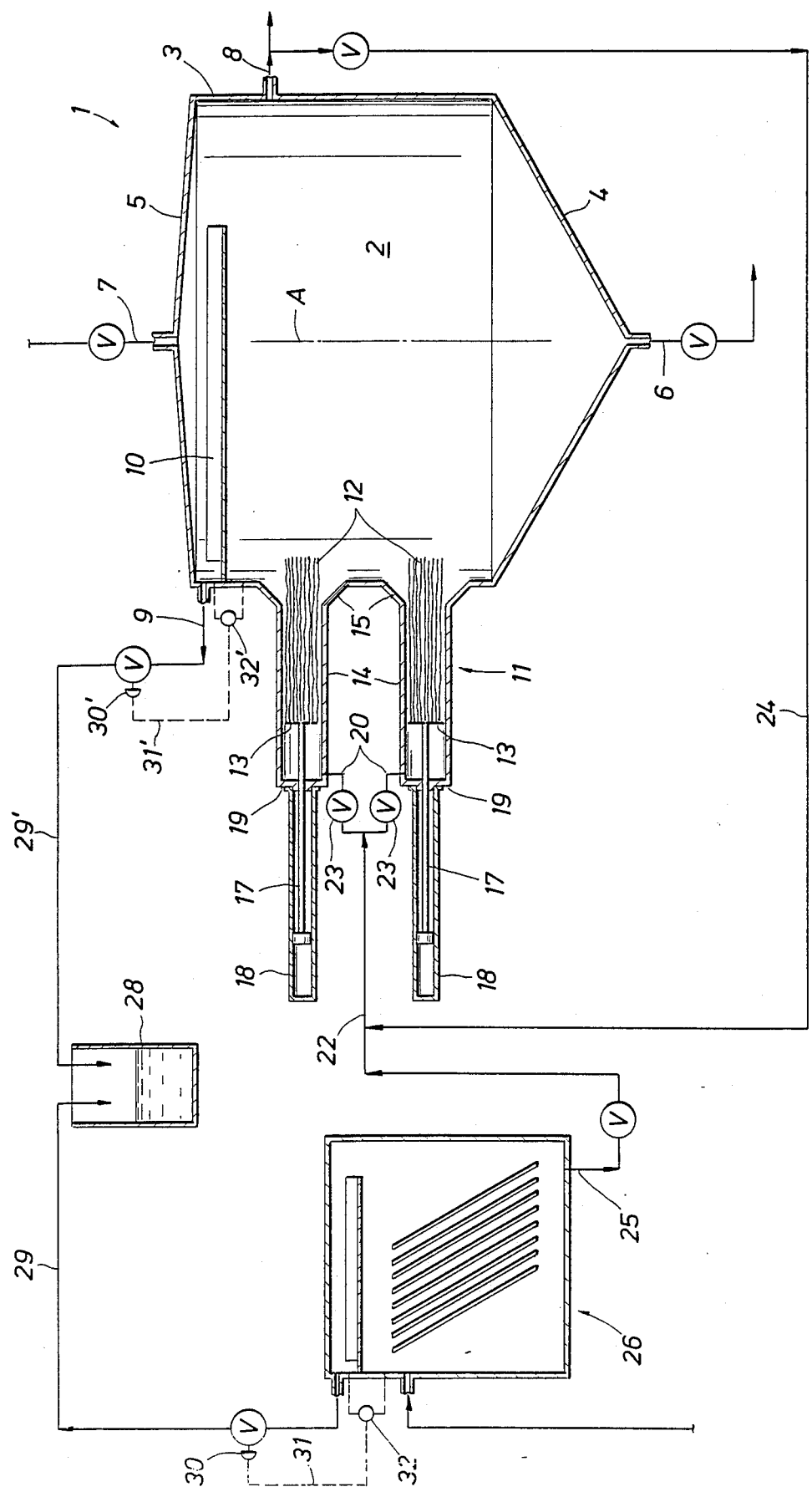

APPARATUS FOR SEPARATING DISPERSED PHASES FOR FLUID MIXTURES

BACKGROUND OF THE INVENTION

This invention relates to an apparatus for separating dispersed phases from fluid mixtures, such as fluid mixtures comprising water in which finely dispersed oil droplets, solid contamination i.e., suspended solids, foam and sludge may be present.

It is know from British Patent Application No. 2,161,395 to utilize a fibrous bed coalescer to coalesce finely dispersed droplets to droplets of a larger size which can be separated from the carrier fluid in a fluid separation chamber. The known coalescer comprises a cluster of fibers which can be pulled into a substantially vertically oriented neck portion at the upper or lower end of a fluid separation chamber so as to create a bed of packed, but substantially stretched fibers in said neck portion.

A drawback of the known coalescer is that if the device is used for separating e.g. oil droplets from an aqueous carrier flow and the fibrous bed is located at the bottom of a fluid separation chamber solid contaminants could accumulate in the fibrous bed thereby increasing the speed of the fluid flowing through the remaining open channels and reducing the coalescence efficiency. If, on the other hand, the known separator is used to separate oil droplets from a carrier fluid having a lower density than oil and the fibrous bed is located at the top of the separation chamber than gas bulbs and foam may accumulate in the fibrous bed thereby blocking fluid flow through these channels and increasing the speed of the remaining open channels and reducing the coalescence efficiency.

An object of the invention is to provide an apparatus for separating dispersed phases from fluid mixtures having a fibrous bed which will not be sensitive to accumulation of solid debris, foam, or other contaminants in the bed and which requires less frequent cleaning of the fibrous bed than the known apparatus.

It is a further object of the present invention to provide an apparatus which can be used for separating a heavy portion such as a sludge or solid particles from a carrier liquid and separating simultaneously coalesced droplets of a low density fluid from the carrier fluid such that each of said phases can be separated in a continuous manner from the apparatus without requiring interruption of the fluid treating operations, even if said phases pass in slugs through the apparatus.

SUMMARY OF THE INVENTION

The apparatus according to the invention comprises
a fluid separation chamber, said chamber being provided with a plurality of fluid outlet ports for allowing discharge of fluids of different densities from the chamber, said ports being located at different levels relative to a vertical axis of the chamber;
fluid inlet means for introducing the fluid mixture into the chamber, said fluid inlet means comprising at least one tubular neck portion in which a cluster of elongate fibers is arranged such that in use the fibers are at least along part of their length compressed between the walls of the neck portion, said tubular neck portion being located at a selected level between a top portion and a bottom portion of the chamber and being oriented at an angle relative to said vertical axis.

BRIEF DESCRIPTION OF THE DRAWING

The drawing shows a schematic sectional view of an apparatus according to the invention in a fluid separation system.

DESCRIPTION OF PREFERRED EMBODIMENTS

Preferably, the fluid separation chamber has a conically shaped bottom portion, a tubular vertically arranged side wall and a substantially flat or dome shaped top portion. The fluid separation chamber may be provided with a first fluid outlet port at the lower end of the conical bottom portion for allowing discharge of solid contaminations and sludge from the chamber. A second fluid outlet port may be arranged in the side wall of the chamber for discharging purified water or another carrier fluid from the chamber, and a third fluid outlet may be arranged near the top of the chamber for discharge of coalesced oil droplets from the chamber above said second fluid outlet.

Most preferably the apparatus is provided with a plurality of tubular neck portions which are mounted in a substantially radial orientation on said tubular side wall of the chamber at a location opposite to said second fluid outlet port. The substantially radial orientation of the tubular neck portions causes the fluid mixture to flow in a substantially horizontal direction through the fibrous bed so that solid debris or foamy contaminations that could be trapped in the bed will be washed away by the fluid flow through the bed during operation of the coalescer.

The invention will now be explained in more detail with reference to the accompanying drawing. In the drawing the apparatus according to the invention is provided with the reference numeral 1. The apparatus comprises a fluid separation chamber 2 having a tubular side wall 3 which is coaxial to a vertical axis A, a conical bottom portion 4 and a slightly domed top 5. The apparatus 1 shown in the drawing is designed for use as a three phase separator in which finely dispersed oil droplets and heavy sludge or solid contaminants are removed from an aqueous carrier fluid. The apparatus 1 comprises a first fluid outlet port 6, which is arranged at the bottom of the conical portion 4, for removal of the heavy sludge and solid contaminants and a second fluid outlet port 8 arranged in the tubular side wall 3 of the chamber 2 for removal of the purified aqueous carrier fluid. The apparatus 1 further comprises a third fluid outlet 9 located above a trough 10 near the top 5 of the chamber for removal of coalesced oil droplets from the fluid separation chamber 2 and a gas vent pipe 7 located near the center of the top 5.

The apparatus 1 is further provided with fluid inlet means 11 consisting of a number of fibrous beds 12 which are arranged in tubular neck portions 14 (two are shown in the Figure). The fibrous beds 12 consist of clusters of elongate fibers which are secured to supports 13 which pull the fibers along at least part of the length thereof in the tubular neck portions 14 which are secured in a substantially radial orientation to the tubular side well 3 of the chamber 2 by conical transition portions 15.

The fibers may be attached to supports 13 consisting of perforated plates or of more typical mop construction. The complete fibrous bed assemblies are secured to plungers 17 in such a manner that the assemblies can be replaced from time to time. The plungers 17 can be moved in longitudinal direction through the neck portions 14 by circulating a hydraulic fluid through hydraulic cylinders 18 which are secured to the outward ends 19 of the neck portions 14.

The fluid mixture to be treated is fed into the tubular neck portions 14 via fluid inlet ports 20 which are located near said outward ends 19 of the neck portions 14. Both fluid inlet ports 20 are connected to a common fluid feed pipe 22 by two short conduit sections in which valves 23 are arranged to enable the fluid mixture to flow either into a selected neck portion 14 or into both neck portions 14 simultaneously. The tubular neck portions 14 are secured to the tubular side wall 3 of the chamber at a position opposite to the second fluid outlet 8 so as to create a long residence time of the carrier fluid in the separation chamber 2 which is beneficial for the purification process inside the chamber 2. If desired the purification process may be repeated by recycling at least some of the fluid flowing through the second fluid outlet 8 via a feedback, i.e., recycle, conduit 24 to the fluid feed pipe 22.

As illustrated in the drawing in a preferred embodiment the fluid feed pipe 22 is connected to the downstream end 25 of a tilted plate separator 26 in which the more or less continuous oil phase is separated from the carrier fluid. In this manner the carrier fluid pumped via the fluid feed pipe 22 into the fibrous bed or beds 12 contains only finely dispersed oil droplets and not a continuous oil phase which would cause rapid saturation of the fibers with oil thereby increasing the rate of bed cleaning cycles needed and reducing the efficiency of the apparatus 1. However, in the absence of such pretreatment process the apparatus 1 will still operate albeit at a reduced throughput.

The oil phase separated form the fluid mixture in the tilted plate separator 26 and the coalesced oil separated from the fluid mixture in the separation chamber 2 may be pumped to a common oil collecting drum 28 or oil production line (not shown) via oil outlet conduits 29 and 29'. The amount of oil flowing through the oil outlet conduits is regulated by valve means 30 and 30' which are steered vial telemetry links 31 and 31' by oil-water interface detectors 32 and 32' in the tilted plate separator 26 and separation chamber 2.

The arrangement in accordance with the invention of the tubular neck portions 14 containing the fibrous beds 12 at a selected level between the top 5 and bottom 4 of the chamber 2 has the advantage that it enables the simultaneous removal of heavier sludge and solids via the first fluid outlet 6 at bottom 4 of the chamber and of coalesced oil droplets via the third outlet 9 at the top of the chamber 2, which would not be possible with the known coalescer having a vertically oriented neck portion at the top or bottom of the separation chamber. Furthermore, the arrangement of the tubular neck portions at an angle relative to the vertical ensures that solid debris, sludge or foam do not accumulate in the fibrous bed or beds thereby increasing the time interval of operation between maintenance and cleaning of the bed or beds. By furthermore providing the apparatus with a plurality of fibrous beds which can be connected either alternately or in parallel to a fluid feed line the time interval between maintenance and cleaning of the fibrous beds can be further increased.

The fibers used in the apparatus according to the invention may be made of any suitable material to which oil droplets adhere, such as glass or polypropylene filaments. The fibers may be treated with N-($\beta$-aminoethyl)-$\gamma$-aminopropyltrimethoxysilane to provide the fibers at least at the surface thereof with an electrical charge. A suitable treatment of this kind is disclosed in British Patent Specification No. 2,135,207.

Many other variations and modifications may be made in the apparatus and technique hereinbefore described, both by those having experience in this technology. Accordingly, it should be clearly understood that the accompanying drawing is illustrative only and are not intended as a limitation on the scope of the invention.

We claim:

1. An apparatus for separating dispersed phases from a feed mixture of fluids of different densities, the apparatus comprising a fluid separation chamber, having a vertical axis and conically shaped bottom portion, a tubular vertically arranged side wall which is coaxial to said vertical axis and a substantially flat top portion, said chamber being provided with a first, second and third fluid outlet port for allowing discharge of fluids of different densities from the chamber, said ports being located at different levels relative to said vertical axis of the chamber; said first fluid outlet port being located at the lower portion of said conical bottom portion, said second fluid outlet port being located in said tubular side wall and said third fluid outlet port being located near the top of the fluid separation chamber, above said second fluid outlet port, fluid inlet means for introducing said feed mixture into the chamber, said fluid inlet means comprising at least one tubular neck portion in which a cluster of elongated fibers is arranged such that in use the fibers are along part of their length compressed between the walls of the neck portion, said at least one tubular neck portion being located at a selected level between said top portion and said bottom portion of the chamber, and said at least one tubular neck portion being connected to a single fluid feed pipe by conduit means, said conduit means being provided with valve means for guiding the fluid flow into said at least one neck portion.

2. The apparatus of claim 1 having more than one tubular neck portion, and wherein each said at least one tubular neck portion is oriented at an angle of about 90° relative to said vertical axis.

3. The apparatus of claim 1, wherein said at least one tubular neck portion is mounted in a substantially radial orientation on said tubular side wall of the chamber at a position opposite to said second fluid outlet port.

4. The apparatus of claim 1, wherein said at least one tubular neck portion has a substantially cylindrical shape and is secured to said tubular side wall of the chamber by a substantially conical transition portion.

5. The apparatus of claim 1, wherein said at least one tubular neck portion having said cluster of fibers is mounted on a movable support, said support being secured to an actuator mechanism for moving the support in a substantially longitudinal direction through the neck portion.

6. the apparatus of claim 5, wherein said actuator mechanism is a hydraulically actuated plunger.

7. The apparatus of claim 1, wherein said second fluid outlet is connected to said fluid inlet means by a recycle conduit, for recycle flow of fluid to said fluid inlet, said recycle conduit being provided with valve means for regulating said fluid flow through the recycle conduit.

8. The apparatus of claim 1, wherein the fluid feed pipe is connected to a fluid outlet opening of a tilted plate separator.

9. The apparatus of claim 1, having more than one tubular neck portion wherein each tubular neck portion is oriented at substantially similar angles relative to said vertical axis.

* * * * *